May 14, 1935. K. F. MARX 2,001,280
STEREOSCOPIC MOVING PICTURE FILM PRINTING MACHINE
Filed April 10, 1933 2 Sheets-Sheet 1
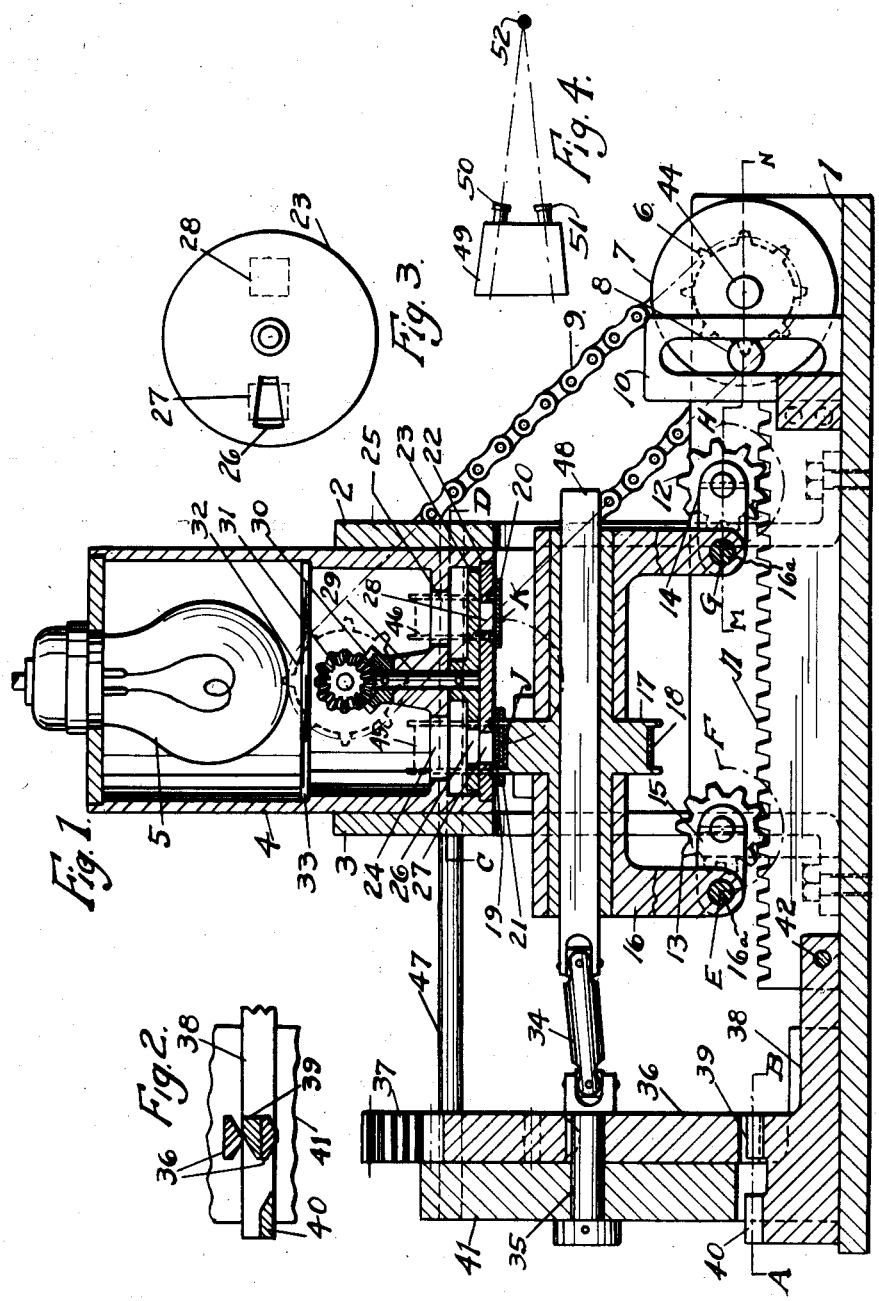
INVENTOR.
Karl F. Marx.

May 14, 1935. K. F. MARX 2,001,280
STEREOSCOPIC MOVING PICTURE FILM PRINTING MACHINE
Filed April 10, 1933 2 Sheets-Sheet 2
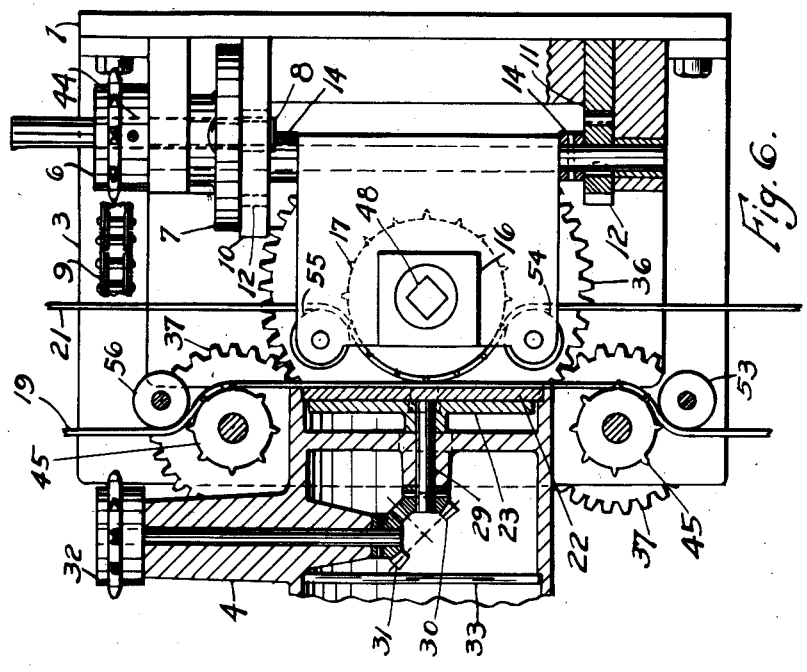
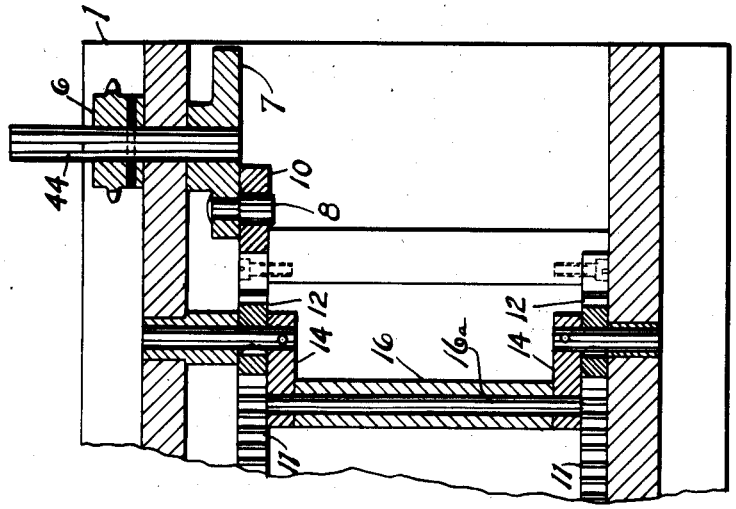
INVENTOR.
Karl F. Marx Patented May 14, 1935

2,001,280

UNITED STATES PATENT OFFICE 2,001,280

STEREOSCOPIC MOVING PICTURE FILM PRINTING MACHINE

Karl F. Marx, Dearborn, Mich.

Application April 10, 1933, Serial No. 665,272

5 Claims. (Cl. 95—75)

This invention relates to machines for printing positive films for motion picture projection and more especially for printing stereoscopic films.

Among the objects of the invention is the printing upon a single film of negatives prepared in stereoscopic cameras.

Another object is means for printing upon a single film from two negative films, of exposures alternately from each of the two, which negative films may be made either in a stereoscopic camera or in two separate cameras properly related and synchronized for either simultaneous or alternating exposures.

Other objects will readily occur to those skilled in the art upon reference to the following description and the accompanying drawings, in which Figure 1 is a longitudinal sectional view of the device.

Figure 2 is a sectional view of the index mechanism on line A—B of Figure 1.

Figure 3 is a plan view of the shutter disc on line C—D of Figure 1.

Figure 4 shows a diagrammatic plan view of a stereoscopic camera.

Figure 5 is a cross-sectional view on line M—N of Figure 1, and

Figure 6 is an end view with parts in section.

Like characters of reference are employed to designate the corresponding parts.

The number 1 indicates the base upon which uprights 2 and 3 are mounted to support the light proof case 4 with the light bulb 5 fastened therein. Below the light bulb the matte glass disc 33 permits the light to pass without a glare through the openings 24 and 25 arranged opposite each other in the lower part of case 4. Through a drive shaft 44, motive power can be transmitted from sprocket 6 and link chain 9 to sprocket 32, thence to miter gears 31 and 30 and shaft 29 for the purpose of driving the shutter disc 23 in synchronism with the rest of the mechanism.

In its rotation the single slot 26 in the shutter disc 23 will pass over the openings 27 and 28 in plate 22 to permit the light to strike alternately the two negative stereoscopic films 19 and 20 which are arranged to pass under the openings 27 and 28 and are guided by the cog wheels 45 and rollers 53 and 56. Arranged below case 4 and below the negative films 19 and 20 is a positive film carriage 16, and rotatably mounted in this carriage 16 are rollers 54 and 55 and cog wheel 17 for guiding and feeding the positive film 21.

In order to print upon film 21 alternately from the films 19 and 20, the former must be transferred from one to the other during the time the slot 26 is moving from one to the other of openings 27 and 28 and the positive and negative films must be stationary relative to each other during the exposure.

This is accomplished by mounting the carriage 16 upon shafts 16a carried upon crank arms 14 and 15, which in turn are fixed to gears 12 rotatably mounted in fixed portions of base 1 and coacting with racks 11 which are movable longitudinally through yoke 10 and crank pin 8 on disc 7, the latter being fixed to shaft 44.

Rotating the crank disc 7 therefore will transmit through crank pin 8 and yoke 10 reciprocating motion to toothed racks 11. Through the action of said racks upon gears 12 and 13 and crank arms 14 and 15 the carriage 16 will swing back and forth so that (looking at Figure 1) point E will move on a half circle to point F, and point G also on a half circle to point H, and consequently the positive film 21 at point J under the opening 27 will move to point K under the opening 28.

Fixed to the end of one of racks 11 by pin 42 is a slide 38 carrying cams 39 and 40 (see Figure 2) which coact with the teeth of an index gear 36. The reciprocation of the slide will therefore rotate the gear 36 step by step.

The square or splined shaft 48 slidably mounted in cog wheel 17 is driven by index gear 36 through shaft 35, the latter being rotatably mounted in block 41 and connected to the universal joint 34. The two gears 37 for driving the cog wheels 45 and 46 through shafts 47 are in mesh with index gear 36. It is understood that this construction is timed in synchronism with the film movement and the shutter disc 23. It is preferred to provide a rubber band or tread 18 on cog wheel 17 to insure resilient pressure of the positive film 21 upon the negative films 19 and 20 during the light exposures.

It will be noted that the gearing and sprocket sizes are such as to move the negative and positive films at the same speed and for this reason alternate exposures on each negative film will not be printed, but, by utilizing gearing to properly change the relative speeds of the films, all of the negatives or less than half of them may be printed as desired.

The whole apparatus should operate in a photographic dark room. For an aid in explaining a stereoscopic camera 49 with two lens pieces 50 and 51 and focus point 52 is shown in plan view in Figure 4.

Although a specific embodiment of the present invention has been illustrated and described it is to be understood that various changes may be made in the details of construction without departing from the spirit of the invention as set forth in the appended claims, and such changes are contemplated.

What I claim is:

1. A printing machine for stereoscopic moving picture films comprising a light proof case, a light source therein, two openings in said case for the passage of light therethrough, a shutter operable to uncover alternately said two openings, means for intermittently moving a negative film opposite each of said openings in printing relation thereto, in synchronism with the said shutter, and means for passing a positive moving pictures film in the same direction and in printing relation with said negative films and alternately contacting with said negative films whereby to make one exposure upon the positive film through one of the negative films and then another exposure consecutively upon the same positive film through the other negative film.

2. Means for printing stereoscopic motion picture films, comprising a light-proof casing having a source of light therein and a pair of shutter controlled light passages for emission of light therefrom, means for supporting a negative film over each of said openings, a positive film carriage constructed and arranged to press said positive film against one of said negative films, means to move said carriage from the one of said negative films to the other, actuating means for said carriage, actuating means for said shutter means and means for synchronizing the two last mentioned means to open each shutter controlled passage when the negative and positive films are in contact.

3. Means for printing stereoscopic motion picture films, comprising a light-proof casing, a source of light therein, and a pair of openings for passage of light therefrom, a single shutter arranged to open alternately said openings, means for supporting and intermittently moving a negative film over each of said openings in light-transmitting relation thereto, a reciprocating carriage for supporting a positive film, means on said carriage for supporting and intermittently moving said positive film and pressing said positive film against said negative films alternately as said light passages are respectively opened, and means for reciprocating said carriage and operating said shutter in synchronism.

4. In a printing device for a motion picture film in which alternate positives are to be printed from two negative films, means for contacting said positive film alternately with said negative films, said means comprising a carriage for the positive film including means for moving the latter intermittently longitudinally, crank means supporting said carriage, gears for operating said crank means and rack means for oscillating said gears.

5. In a printing device for a motion picture film in which alternate positives are to be printed from two negative films, a source of light, a shutter for controlling the passage of light therefrom, means for supporting a pair of negative films in position to alternately transmit the light passed by said shutter, means for supporting a positive film and contacting the latter alternately with the negative films during light passage and means for moving intermittently all of said films longitudinally in unison and at proper relative speeds.

KARL F. MARX.